United States Patent Office 3,663,461
Patented May 16, 1972

3,663,461
CHAIN EXTENDED POLYELECTROLYTE SALTS AND THEIR USE IN FLOCCULATION PROCESSES
Edward Witt, Dover, Del., assignor to Standard Brands Chemical Industries, Inc., Dover, Del.
No Drawing. Continuation-in-part of application Ser. No. 763,977, Sept. 30, 1968. This application June 30, 1970, Ser. No. 51,344
Int. Cl. C08g 33/00, 33/06
U.S. Cl. 260—2 BP
11 Claims

ABSTRACT OF THE DISCLOSURE

Water-soluble poly(quaternary ammonium) polyether polyelectrolyte salts containing quaternary nitrogen atoms in the polymer backbone and chain-extended by ether groups are prepared by treating the polymeric reaction product from an N,N,N',N'-tetraalkyl-hydroxy substituted diamine and an organic dihalide such as a dihaloalkane or a dihalo ether with an epoxyhaloalkane. These polyelectrolytes are used in processes for flocculating particles dispersed in aqueous media, for example, white water clarification, clay flocculation, sewage treatment, and wet-end addition, by adding the polyelectrolyte to the aqueous media in amounts sufficient to flocculate the dispersed particles.

CROSS-REFERENCE TO RELATED APPLICATIONS

This application is a continuation-in-part of applicant's copending application Ser. No. 763,977 entitled "Flocculation of Particles Dispersed in Aqueous Media," filed on Sept. 30, 1968 and now abandoned.

BACKGROUND OF THE INVENTION

This invention relates to poly(quaternary ammonium) polyether polyelectrolyte salts that contain quaternary nitrogen in a polymeric backbone and that are chain-extended by ether groups and their preparation from water-soluble poly(quaternary ammonium salts) containing pendant hydroxyl groups and bifunctionally reactive chain-extending agents. This invention further relates to processes for flocculating particles dispersed in aqueous media, e.g. processes for white water clarification, clay flocculation, wet-end addition during paper making, and sewage treatment, by adding the polyether polyelectrolytes to the aqueous media in amounts sufficient to cause flocculation.

In the flocculation of particles from aqueous media, for example, in the paper making art, a number of agents are known which function as retention aids for both additives and fiber fines. Among the agents known are starch, ether and ester derivatives containing hydrophilic groups, cationic amine starch derivatives, copolymers from acrylamide and acrylic acid, and polyethyleneimine. These agents, particularly those containing tertiary amino groups having a strong positive charge at the nitrogen atom, tend to adhere by electrostatic attraction to cellulosic substrates which are in general negatively charged. Thus, in wet-end sizing of paper, low levels of these agents or retention aids may be used to cause nearly complete retention of the mineral filler and fiber fines in the paper web being formed on the rapidly-moving paper machine wire. The sizing material or retention aid added in the feeder or head box is thus highly substantive to the fibers in the paper web and is of great value for promoting interfiber bonding. Another function of these agents is improved dewatering of the paper stock which leads to faster drainage, higher wet web strength, and lower steam consumption during the drying process.

An allied problem in paper technology is the clarification of white water, that is, the effluent material coming from the web forming and drainage procedures that contains finely colloidally dispersed pigmentary and fibrous waste which must be removed before the effluent can be discharged into a stream or sewage-treatment plant. It is advantageous to remove this waste even when the white water is being recycled. Often polymeric flocculants or coagulants are used to remove this waste. When pigments or fillers are a component of the effluent, it is most advantageous to coagulate and also to recover these valuable materials.

In the mining and metallurgical arts, flocculating agents are frequently used to recover ores from suspensions in water. The aggregated fine ores are recovered, while at the same time the water is clarified. The advantages of using a flocculant in these systems are both the increased settling rate and the enhanced filtration rate of the resulting clarified water system. If no flocculating agent is used in these settling operations, only the heavier solid particles settle at the bottom of the chamber in a reasonable length of time, while the remaining finely divided colloidal material is suspended in the supernatant liquor, often for days. Also, various flocculating agents are useful in clay benefication, particularly in treating clays used in drilling muds.

Heretofore several problems have been encountered with the known flocculants or coagulants used for separating dispersed particles and the like materials from aqueous media. One problem is that excessively large amounts of the flocculant are often required to effect the desired separation or settling out of the dispersed materials. When this problem is overcome by the use of a more efficient flocculant, it may be difficult to control the viscosity of the flocculant at the concentrations required for the intended application or the flocculant may be too costly and/or not readily available. The cost factor is particularly troublesome where the primary purpose of the water treatment is for pollution control such as in sewage treatment. In this regard, it is evident from the current interest in environmental improvement that pollution of waterways, such as streams, rivers, lakes, etc. is an increasing problem that must be solved by many industries in general and particularly those which produce aqueous wastes requiring the use of flocculants and coagulants.

SUMMARY OF THE INVENTION

Advantageously this invention provides cationic polyelectrolytes which overcome many of the problems of the known polymeric flocculants and coagulants. Thus, this invention contemplates poly(quaternary ammonium) polyether polyelectrolyte salts containing quaternary nitrogen atoms in a polymeric backbone which are highly efficient flocculants. These salts are prepared by treating the polymeric reaction product from an N,N,N'N'-tetraalkyl-hydroxy-alkylenediamine and an organic dihalide such as a dihaloalkane or a dihaloether with an epoxy haloalkane.

This invention is further directed to a method for preparing these polymeric water soluble polyether polyelectrolyte salts which comprises reacting the reaction product of the N,N,N',N'-tetraalkyl-hydroxy-alkylenediamine and the organic dihalide at a temperature of from about 50° C. to about 80° C. in the presence of an alkaline material in an aqueous reaction medium containing sufficient water to regulate the viscosity of the resulting water-soluble product.

This invention also is concerned with a process for treating a dispersion of particles in an aqueous medium to flocculate the particles, which includes the step of admixing an aqueous dispersion of particles with the cationic N-containing polymeric polyelectrolyte in sufficient amounts to fluocculate the particles. Usually from about 1.0 to 5.0 parts by weight of flocculant per million parts by weight of the aqueous dispersion will obtain excellent separation.

Thus it will be recognized that one advantageous result of this invention, which is of particular importance, is that the chain-extended poly(quaternary ammonium) polyethers used as flocculating agents shown a very high efficiency for effecting flocculation or coagulation of particles dispersed in an aqueous medium.

The polymeric poly(quaternary ammonium) polyethers of this invention have a repeating unit of the following general formula:

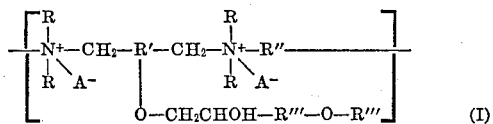

(I)

wherein R is a lower alkyl group, particularly an alkyl group containingg 1–4 carbon atoms; R' is the residue of a hydroxy-substituted alkylene group containing up to about 10 carbon atoms; R" is a lower alkylene group, particularly an alkylene group containing 1–4 carbon atoms such as methylene, ethylene, propylene, butylene, or an oxaalkylene group $(CH_2)_n$—O—$(CH_2)_n$, where $n$ is an integer from 1 to 4; R''' is an alkylene group, particularly methylene, ethylene, propylene, or butylene; R'''' is an R' residue of the same or different polymeric chain or a terminal hydrogen group and A is an anion such as chloride, bromide or iodide.

These poly(quaternary ammonium) polyether polyelectrolytes are derived from the reaction products of tetraalkyl hydroxydiamines of the general formula:

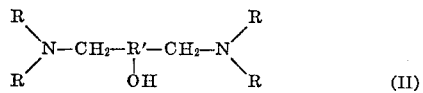

(II)

wherein R and R' are the organic groups defined in Formula I above with approximately an equimolar proportion of an organic dihalide having the general formula:

A—R"—A (III)

wherein A represents the anions and R" represents the organic radicals heretofore defined in Formula I, this reaction may be represented by the following equation:

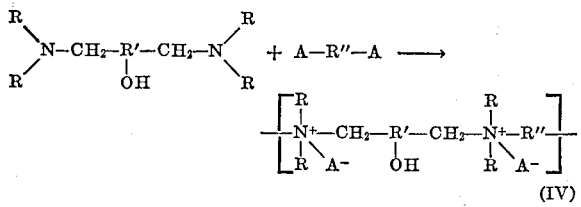

(IV)

The intermediate cationic poly(quaternary ammonium salts) (IV) useful in preparing the flocculants or coagulating agents of this invention are produced by effecting reaction of from about 0.8 to 1.2 moles of the organic dihalide with one mole of the tetraalkyl hydroxy diamine in an aqueous medium at temperatures of from about 75° to about 120° C. for a period of 6 or more hours with continuous agitation. Preferably, the organic dihalide is used in excess of equi-molar proportions in order to increase the reaction rate.

The tetraalkylated hydroxy diamine designated by Formula II can be prepared by various reaction routes. One particularly effective route involves reacting an aqueous solution of a dialkylated secondary amine, such as dimethylamine, with a bifunctional compound, such as epichlorohydrin; 1,3-dichloro-2-propanol; 4-chloro-1,2-epoxy-butane; bis (epoxyethyl) ether; and the like. In general, at least three moles of the secondary amine are used per mole of the difunctional compound.

When a chloro-containing difunctional compound is used in the preparation, the amine hydrochloride produced is removed by treatment with a base, such as sodium hydroxide. Excess water and the secondary amine are removed by vacuum stripping.

The ditertiary amine is extracted with ethanol or like polar-type solvents from the resulting residual salt slurry. The ethanol is removed by vacuum distillation. The pure ditertiary amine is then obtained by vacuum distillation.

Exemplary of the tetraalkyl diamines that can be used to prepare the poly(quaternary ammonium) intermediates for preparing the flocculants or coagulants of this invention are N,N,N',N'-tetramethyl-2-hydroxyl-1,3-propane diamine; N,N,N',N'-tetraethyl - 3 - hydroxy-1,4-butane diamine; N,N,N',N'-tetramethyl - 2,3 - dihydroxy-1,4-butane diamine; and the like.

The organic dihalides which are reacted with the tetraalkyl hydroxy diamines include beta, beta'-dichlorodiethyl ether; 1,2-dichloroethane; 1,2-dibromoethane, (ethylene dibromide); 1,3-dibromopropane; 1,3-dichlorobutane; 1,4-diiodobutane; and the like.

In preparing the intermediate poly(quaternary ammonium salts), water is employed in amounts sufficient to insure solution of the reaction product and to adjust viscosity. In general, from about 50 parts to 100 parts by weight of water are used per 100 parts of the reactants. Upon completion of the reaction, the resulting poly(quaternary ammonium salt) may be used in solution as prepared or may be dried to form a highly hygroscopic, resinous, light yellowish-brown product.

It has been found that a particularly useful intermediate for poly(quaternary ammonium) polyether polyelectrolyte compositions of this invention are obtained by reacting dichlorodiethyl ether with N,N,N',N'-tetramethyl-2-hydroxyl-1, 3-propane diamine in approximately equimolar proportions at temperature of 75° to 80° C. and in an aqueous medium for 6 hours.

Poly(quaternary ammonium salts) useful in preparing the coagulating agents of this invention may be prepared by the reaction between a hydroxydihaloalkane derivative and a tetraalkyldiaminoalkane derivative by the following reaction:

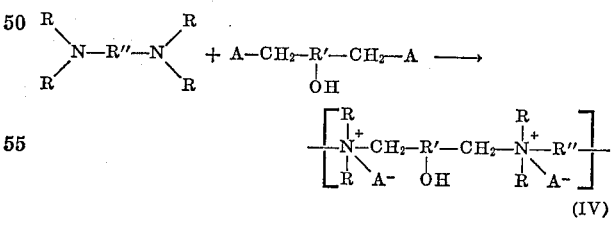

(IV)

where R, R', and R" represent the organic radicals defined in Formula I and A represents the anion. Examples of dihalo compounds useful for this purpose include 1,3-dichloro-2-hydroxypropane, 1,3 - dibromo - 2-hydroxypropane, 1,4-dichloro - 2 - hydroxybutane bis(2-chloro-1-hydroxyethyl) ether, and the like.

Tetraalkyldiamines useful in this synthesis include N,N,N',N'-tetramethyl - 1,2 - ethane diamine, N,N,N',N'-tetraethyl-1,5-pentane diamine, N,N,N',N' - tetramethyl-1,6-hexane diamine, bis(N,N-dimethylaminoethyl) ether, and the like.

The polyether polyelectrolytes of this invention are preferably made by the reaction between a poly(quaternary ammonium) polyelectrolyte of the type designated by Formula IV containing a hydroxyl substituent and an epoxyhaloalkane such as epichlorohydrin. The first step of the reaction with a epoxyhaloalkane is represented as follows:

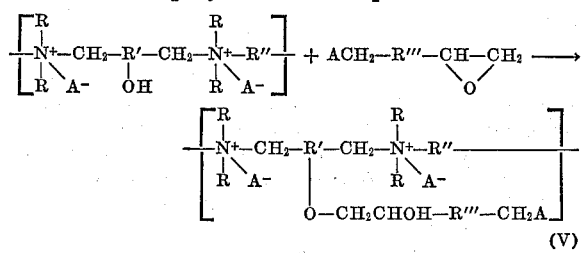

in which the epoxide reacts with a pendant hydroxyl group. The product obtained has a reactive halide which, when R''' is methylene, reacts with the alkaline reagent e.g., sodium hydroxide, to form an epoxy group. The epoxy group may then react with a hydroxy group on a polymeric backbone of the polyelectrolyte to cause chain-extension of the polyelectrolyte. Alternatively, the epoxy group may react with water in the presence of the alkaline material to form a hydroxy group.

Epoxyhaloalkanes useful in preparing the materials of this invention include epichlorohydrin (1-chloro-2,3-epoxypropane), 1-bromo-2,3-epoxypropane, 1-chloro-3,4-epoxybutane, 2 - chloro - 5,6 - epoxy-hexane, 1,2-epoxy-6-iodohexane, and the like. Epichlorohydrin is particularly preferred for purposes of this invention for reasons of economy and availability.

An alkaline reagent or material must be used to promote the chain-extension reaction with an epoxyhaloalkane. This reagent is an alkali metal hydroxide or an alkaline earth metal oxide or hydroxide. Sodium hydroxide is a particularly effective reagent for this reaction.

The Brookfield viscosity of the resulting polymer solution, determines the enhanced usefulness of the polyether polyelectrolytes as flocculating agents. This viscosity is critically dependent on the concentrations of water, epoxyhaloalkane, and alkaline reagent used, as well as on the reaction temperatures employed during formation of the chain-extended polyelectrolytes.

Thus it has been found that a number of parameters critically affect the chain-extending reaction of this invention. The influence of the amount of water, epoxyhaloalkane, and alkaline material to the amount of reaction product from the tetraalkyl-hydroxy-alkylenediamine and an alpha,omega-dihaloalkane derivative with epichlorohydrin, as well as the effect of reaction temperatures and times must be carefully controlled.

It has been determined that the use of from about 1.1 to about 2.3 moles of epihalohydrin per mole of repeating poly(quaternary ammonium) intermediate (IV) (hereinafter referred to as "Polyquat") gives higher polymer solution viscosities, even at low solids levels, than those of the starting high-solids Polyquat solution. Very viscous solutions are obtained when from about 1.1 to about 1.7 moles of epihalohydrin are used per mole of repeating Polyquat unit. Despite the high viscosity of the solutions, they are completely gel-free. It will be appreciated that the amount of chain-extension by cross-linking must be controlled in order to obtain such gel-free products. At higher ratios of epihalohydrin to Polyquat, it has been found that substantailly increased product solution viscosities, up to a ratio of about 2.3 moles of epihalohydrin per mole of Polyquat unit are obtained. Above this epihalohydrin to Polyquat ratio, the products are more viscous than the starting Polyquat, but only slightly more so. In view of these findings, it is believed that chain-extension of the Polyquat occurs by cross-linking, with the optimum amount of cross-linking being controlled to insure that the resulting product is water-soluble and has increased viscosity.

In systems involving a Polyquat, an epihalohydrin, and sodium hydroxide, about 1.0 mole of sodium hydroxide per mole of Polyquat repeating unit is particularly effective. However, ratios of from 0.75 to about 1.6 moles of sodium hydroxide per mole of Polyquat unit give significant increases in solution viscosities.

It will be understood that the chain-extension reaction between Polyquats and an epihalohydrin is also dependent on the reaction temperature. A particularly advantageous reaction temperature, using increasing product solution viscosity as a criterion, is about 70° C. However, chain-extension may be effected at reaction temperatures between 60° and 80° C. At 80° C. and above there is a decrease in the chain-extending reaction. It is believed that the reason for the decrease in chain-extension during the reaction at 80° C. results from a competing epihalohydrin hydrolysis reaction to produce the glycol groupings which are unreactive with the hydroxyl groups on the Polyquats.

Of the several experimental parameters related to preparing the polyether polyelectrolytes, the amount of water added both initially and during the course of the chain-extension reaction is exceedingly critical. Water is charged to the reaction vessel at first to dissolve the sodium hydroxide or other alkaline reagent. In a system employing epichlorohydrin as the chain-extending agent and sodium hydroxide, the most viscous polymer solutions are obtained when about 10 moles of water are used per mole of Polyquat repeating unit. When less than this amount is used, the product is gelatinus. At levels of initial water addition above about 12 moles of water per mole of Polyquat unit, the chain-extension reaction is limited as evidenced by the fact that the increase in solution viscosity is slight.

As the chain-extension reaction proceeds, the resulting solutions become too viscous for proper agitation, so that water must be added to give a workable viscosity. The amount of water which must be added varies between about 25 and about 120 moles of water per mole of Polyquat units and the manner in which this water is added has profound influence on the resulting solution properties. When this water is added early in the reaction, that is soon after the mixture of water, alkaline reagent, epihalohydrin, and Polyquat is charged to the reaction vessel, the reaction products are markedly less viscous than when water is added later in the reaction run. It has also been found that the incremental addition of water of dilution is helpful in attaining solutions with very high viscosities. For convenience, it is particularly preferred to add this water by a programmed addition procedure using a metering injection pump.

In order to estimate molecular weights of the Polyquats ad their chain-extended derivatives of this invention, intrinsic viscosities of selected samples were determined at 25° C. in 0.4 M KCl and 0.4 M KBr. This is done by preparing dilute solutions of the polymers in the medium and determining their specific viscosities ($\eta_{sp}$), where $\eta_{sp}$ equals $t/t' -1$ where $t$ is the time of flow for a solution of concentration C and $t'$ is the flow time for the pure solvent. A plot of $\eta_{sp}/C$ yields a straight line of which the intercept is intrinsic viscosity $[\eta]$. The intrinsic viscosity of a typical starting material, i.e. the reaction product of N,N,N',N'-tetramethyl-2-hydroxy-1,3-propane diamine and dichloroethyl ether, in 0.4 M KCl varied between 0.06 and 0.22 (In 0.4 M KBr, the viscosity was 0.17). Based on the observation that the intrinsic viscosity was 0.22 gram per deciliter for an "ionene," i.e.

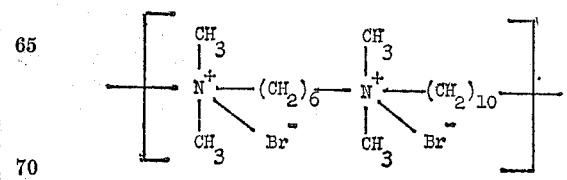

prepared from N,N,N',N'-tetramethyl-1,6-hexane diamine and 1,10-dibromodecane (as described in the Journal of Macromolecular Science-Chemistry, volume A3 (1), page 95, January 1969) and which has a weight average molecular weight of 15,000±500 by light scattering measurements, it is believed that the starting Polyquats are of the order of about 10,000 molecular weight, that is, there may be between about 10 and about 40 units in the starting Polyquat chain. The chain-extended polyether polyelectrolytes have even higher intrinsic viscosities and are therefore most likely higher molecular weights. Generally, the $[\eta]$ of the chain-extended polyelectrolytes varies from about 0.25 to about 0.60 in 0.4 KBr at 25° C.

The polyether polyelectrolytes of this invention are particularly useful as flocculating agents for finely divided mineral materials, such as clay. Chain-extended Polyquats with Brookfield viscosities in the range between about 100 and about 25,000 centipoises at roughly 30% solids content are especially effective as flocculating agents. It has been found that polyether polyelectrolytes with Brookfield viscosities below about 25,000 centipoises are more effective as flocculants than higher viscosity polyether polyelectrolytes or than the starting Polyquats. Polyether polyelectrolytes in this preferred viscosity range compare very favorably in efficiency with flocculants now commercially in use, even at low levels of addition of the range between 1 to 5 parts per million.

The polyether polyelectrolytes are also useful as clarification aids for white water, as from paper making. Adding as little as 0.1 to 1.0 parts per million of the polyelectrolytes results in significant clarification of white water, to levels of transmission of light at 530 m$\mu$ of around 90% or even higher. These results compare quite favorably to those obtainable with commercial clarification aids, such as Tylite No. 9.

Moreover, the polyelectrolyte solutions function well as pigment retention aids in wet-end addition during paper making. The polymer solutions, when added at levels of between 0.5 lb. and 1.0 lb. per ton of paper-making slurry, result in paper products containing upwards of 30%, and even as high as 45%, of retained pigment as determined by combustion ash. These results are within the ranges achieved by presently used flocculants; in many cases higher pigment levels in the paper are attained than with the commercial additives.

Another process in which the polymer solutions are useful is in flocculating and separating sewage. Polyether polyelectrolytes of this invention may also be used to break petroleum emulsions to separate the oil phase from the water phase and to coagulate polymeric latices.

The following specific examples illustrate typical methods by which the polyelectrolytes of this invention may be made and processes in which they are useful. The examples are intended only to provide a clearer understanding of the invention and not to be considered as limiting its scope.

Example I

This example illustrates preparation of one of the polyquaternary ammonium salts used to prepare the chain-extended polyelectrolytes of this invention.

In a reaction vessel, 3.5 moles of dimethylamine (aqueous solution) were added to 1.0 moles of epichlorohydrin, with the temperature being maintained at 28° to 30° C. during the addition of the epichlorohydrin. Then the contents of the vessel were heated to 65° C. and held at this temperature for 4 hours.

After the reaction, 1.0 mole of sodium hydroxide was added to the reaction vessel. The reaction mixture was then vacuum stripped to remove water and excess dimethylamine. The residue, a salt slurry, was extracted with 1.35 moles of ethanol to remove the ditertiary amine product. The extract was flash distilled under vacuum to remove the ethanol, leaving a residue which was vacuum distilled at a pressure of 5 millimeters of mercury and at a temperature of 55° and 58° C. to provide the product N,N,N',N'-tetramethyl-2-hydroxy-1,3-propane diamine in a yield of 53.6%.

Upon analysis, the product showed a purity of 99%+.

To a reaction vessel were added 145 grams (0.993 mole of the previously prepared N,N,N',N'-tetramethyl-2-hy-droxy-1,3-propane diamine (hereinafter referred to as THPDA); 150 grams (1.048 moles) of beta, beta'-dichlorodiethylether (hereinafter referred to as DCEE); and 50 grams of water, with agitation. This mixture was heated to a temperature of 75° to 80° C. and held at this temperature for a period of 5½ hours. Then an additional 150 grams of water were added and the temperature of the reaction mixture maintained at 75° to 80° C. for an additional ½ hour. A polymeric polyquaternary ammonium salt product, containing repeating units of the following formula:

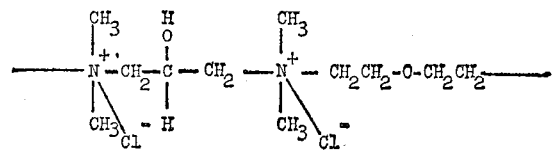

was obtained and found to have a LVT Brookfield viscosity of 318 centipoises measured at 23° C. on a viscometer using a spindle No. 2 and spindle speed of 30 r.p.m. and a solids content of 60.9%.

Example II

Two additional salts were prepared by repeating salt-forming reaction of Example I under the same conditions and by using the same amounts of water and of DCEE with 1.096 moles and 1.370 moles of THPDA, respectively. The resulting polyquaternary ammonium salts had Brookfield viscosities of 210 and 230 centipoises and solids contents of 68.0 and 65.0%, respectively; thus indicating that the viscosities (and molecular weights) are not greatly influenced by variations in the amount of reactants near equimolar proportions.

Example III

Another polymeric polyquaternary salt was prepared by following the procedure and conditions of Example I and by employing 0.993 mole of THPDA and 0.984 mole of ethylene dibromide (EDB). A polyquaternary polyammonium salt having a viscosity of 13.0 centipoises at 23° C. (No. 1 spindle at 60 r.p.m.), a solids content of 63.0%, and containing repeating units of the following formula:

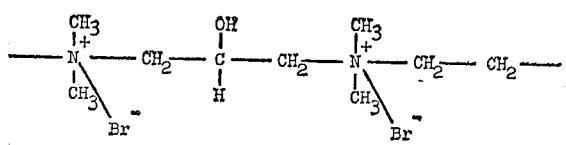

was obtained.

Example IV

Another poly(quaternary ammonium)salt having repeating Polyquat units as illustrated in Example I was prepared in a commercial scale 500-gallon reactor. In this case, 49 parts by weight of THPDA; 51 parts by weight of DCEE and 16.25 parts by weight of water were charged to the reactor and stirred. This mixture was heated to a temperature of about 176° F. and maintained at this temperature for approximately 6 hours. Also a pressure of 5 p.s.i.g. was maintained with an inert gas mixture including nitrogen. The resulting product was steam stripped to remove unreacted DCEE. Then additional water (49.5 parts by weight) was added to adjust the viscosity. The final product had an LVT Brookfield viscosity of 520 centipoises measured at 23° C. on a viscosimeter using a No. 2 spindle and a spindle speed of 30 r.p.m. and a solids content of 55.6%. In the following examples this polymer solution is designated as Polyquat 55.6. At 33.0% solids, Polyquat 55.6 had a Brookfield viscosity of 52 centipoises.

Example V

A Poly(quaternary ammonium) Polyether Polyelectrolyte was prepared in the following manner. Sodium hydroxide (8 grams) dissolved in 40 milliliters of water was added to 100 grams of Polyquat 55.6 stirred in a 500-milliliter reaction flask equipped with a mechanical stirrer, thermometer, reflux condenser, and a nitrogen-blanketing device. The mixture was heated to 70° C. and 40 grams of epichlorohydrin (hereinafter designated EPCHD) was added. A total of 125 milliliters of water was added to the stirred and heated mixture to control viscosity, as follows: 5 milliliters at 10 minutes after EPCHD addition, 15 milliliters at 15 minutes, 50 milliliters at 19 minutes, and 55 milliliters at 29 minutes. The resulting poly(quaternary ammonium) polyether polyelectrolyte solution contained 31.9% solids and had a Brookfield viscosity of 500 centipoises at 23° C. using a No. 2 spindle at a spindle speed of 30 r.p.m. at pH 8.3. This is a ten-fold increase in viscosity over Polyquat 55.6.

Water in amounts varying from 125 to 225 milliliters was added to the reaction mixture continuously beginning immediately after the EPCHD was added with an initial amount of water, at a rate of 1.4 milliliters per minute using a 1 r.p.m. "Emdeco" intravenous injector pump. The stirred mixture was heated by a bath maintained at 70° C. during the entire reaction period. The temperature of the mixture decreased by about 3° C. when the EPCHD was added. After about 10 minutes, a maximum of about 77° C. was attained; the temperature of the reaction mixture decreased to 71° C. after about an hour. The temperature was kept at 70° C. for at least 12 hours or until the pH of the mixture decreased below 8.5. In some cases more water of dilution was added after the continual metered amount.

TABLE 1

| Run No. | Charged [1] EPCHD (grams) | Charged [1] Water (ml.) | Total additional water of dilution (ml.) | Percent solids | Brookfield viscosity at 23° C. Cps. | Brookfield viscosity at 23° C. Spindle No. | Brookfield viscosity at 23° C. R.p.m. |
|---|---|---|---|---|---|---|---|
| 1 | 20 | 36 | [2] 175 | 30.6 | 460 | 2 | 30 |
| 2 | 20 | 37 | [2] 125 | 31.9 | 7,850 | 4 | 30 |
| 3 | 20 | 37 | [3] 387 | 17.0 | 1,850 | 2 | 6 |
| 4 | 20 | 39 | [2] 125 | 33.4 | 75 | 1 | 30 |
| 5 | 20 | 39 | [3] 425 | 26.3 | 52 | 1 | 30 |
| 6 | 15 | 34 | [2] 200 | 30.2 | 12.5 | 1 | 60 |
| 7 | 15 | 34 | [2] 125 | 30.8 | 7.5 | 1 | 60 |
| 8 | 15 | 34 | [4] 175 | 36.6 | 11 | 1 | 60 |
| 9 | 15 | 38 | [2] 225 | 32.2 | 11 | 1 | 60 |
| 10 | 15 | 38 | [2] 125 | 28.7 | 8.5 | 1 | 60 |

[1] With NaOH.
[2] At 1.4 ml. per minute.
[3] All above 125 milliliters at 1.4 ml. per minute as fast as possible.
[4] Incrementally 25 mils at 37 minutes of reaction, 15 mils at 65 minutes of reaction, 10 mils at 90 minutes of reaction.

The product has a structure containing repeating units of the following structure:

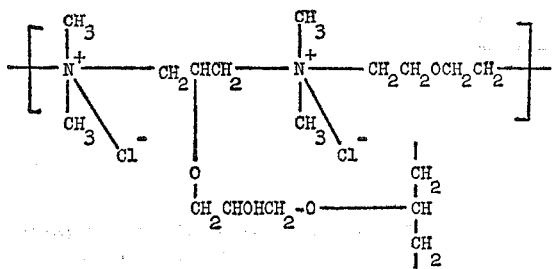

Example VI

The polyquaternary ammonium salt prepared in Example III is treated with 35 grams of EPCHD per 100 grams of polymer solution to yield a poly(quaternary ammonium) polyether polyelectrolyte of higher viscosity than the starting polymer. The structure of this polyquaternary polyether has repeating units of the following formula:

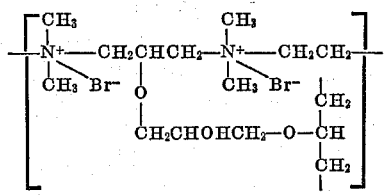

Example VII

This example illustrates the importance of the technique for adding water of dilution to the reaction mixture for preparing the poly(quaternary ammonium) polyether polyelectrolytes so that polymer solubility is maintained without deleterious effect on polymer properties.

To 100 grams of Polyquat 55.6 in a stirred 500-milliliter reaction flask equipped with a mechanical stirrer, thermometer, reflux condenser, and nitrogen-blanketing means was added 8 grams of sodium hydroxide dissolved in the amounts of water shown in the following table. The mixture was heated to 70° C. and EPCHD was added as indicated in the table.

It will be observed that at the higher EPCHD level, the viscosity was improved when the water was kept within certain levels. Thus, the data show that the amount of water which is added to a 100 gram charge of Polyquat 55.6 may vary within the range of about 100 to 400 milliliters of water. This corresponds to between 29 and 116 moles of water per mole of Polyquat 55.6 repeating unit. These experiments further show that adding large amounts of water early in the reaction is detrimental in that the solutions have lower viscosity than those obtained when water is added gradually during the course of a reaction run.

Example VIII

Experiments in this example show the relationship between sodium hydroxide charged to the condensation reaction between Polyquat 55.6 and EPCHD reactant and viscosities of the resulting polymer solutions. Each of the reactions was carried out with external heating at 70° C. and with 125 milliliters of water added at a rate of 1.4 milliliters per minute. In each experiment, 100 grams of Polyquat 55.6, 35 milliliters of water, and 40 grams of EPCHD were charged to the reaction vessel. The sodium hydroxide charge was varied as indicated in the table below:

TABLE 2

| Run No. | NaOH (grams) | Percent solids | pH (after 12 hours) | Brookfield viscosity at 23° C. Cps. | Brookfield viscosity at 23° C. Spindle No. | Brookfield viscosity at 23° C. R.p.m. |
|---|---|---|---|---|---|---|
| 1 | 6 | 31.4 | 8.3 | 91 | 1 | 30 |
| 2 | 8 | 31.9 | 8.5 | 18,500 | 4 | 6 |
| 3 | 10 | 32.5 | 8.4 | 155 | 1 | 12 |
| 4 | 12 | 37.0 | 8.2 | 53 | 1 | 30 |

These runs show that the amount of sodium hydroxide charged to the reaction mixture profoundly affects polymer properties. The highest viscosity product is obtained when about 8 grams of sodium hydroxide is used per 100 grams of Polyquat 55.6; this ratio corresponds to about 1.05 moles of sodium hydroxide per mole of repeating Polyquat 55.6 unit. However, even polymer solutions obtained when the sodium hydroxide ratio is from about 0.75 to about 1.6 moles per mole of repeating Polyquat 55.6 units are higher in viscosity than the original higher-solids Polyquat 55.6 solution, i.e. 52 centipoises.

Example IX

The experiments conducted in this example show the effect on polymer solution viscosity of the amount of water initially charged to the reaction vessel in order to dissolve sodium hydroxide. In each case, the reaction was carried out at 70° C. and a total of 125 milliliters of water was added at the rate of 1.4 milliliters per minute. Polyquat 55.6 (100 grams), 8 grams of sodium hydroxide, and varying amounts of EPCHD and of water were charged to the reaction vessel, as indicated in the following table.

quat 55.6, 8 grams of sodium hydroxide, 35 milliliters of water, and EPCHD in varying amounts. Results were:

TABLE 4

| Run No. | EPCHD (grams) | Percent solids | pH (after 12 hours) | Brookfield viscosity at 23° C. | | |
|---|---|---|---|---|---|---|
| | | | | Cps. | Spindle No. | R.p.m. |
| 1 | 20 | 29.8 | 9.2 | 1,200,000 | 4 | 0.3 |
| 2 | 30 | 29.0 | 8.5 | 156,000 | 4 | 1.5 |
| 3 | 35 | 31.5 | 8.3 | 5,300 | 3 | 6 |
| 4 | 40 | 33.9 | 8.4 | 6,150 | 3 | 6 |
| 5 | 40 | 31.9 | 8.5 | 18,500 | 4 | 6 |
| 6 | 40 | 33.1 | 8.1 | 23,000 | 4 | 6 |
| 7 | 50 | 31.6 | 8.4 | 275 | 2 | 30 |
| 8 [1] | 30 | 20.0 | 8.3 | 600 | 2 | 12 |
| 9 | 15 | 30.8 | | 7.5 | 1 | 60 |
| 10 | 15 | 29.6 | | 8.0 | 1 | 60 |

[1] 225 milliliters of H$_2$O added.

TABLE 3

| | Charged | | | | Brookfield viscosity at 23° C. | | |
|---|---|---|---|---|---|---|---|
| Run No. | EPCHD (grams) | Water (ml.) | Percent solids | pH (after 12 hours) | Cps. | Spindle No. | R.p.m |
| 1 | 40 | 35 | 33.1 | 8.1 | 23,000 | 4 | 6 |
| 2 | 40 | 35 | 31.9 | 8.5 | 18,500 | 4 | 6 |
| 3 | 40 | 35 | 33.9 | 8.4 | 6,150 | 3 | 6 |
| 4 | 40 | 35 | 29.9 | 8.3 | [1] 1,675 | 2 | 6 |
| 5 | 40 | 37 | 32.4 | 8.3 | 320 | 1 | 6 |
| 6 | 40 | 40 | 35.0 | 7.9 | 215 | 1 | 6 |
| 7 | 20 | 35 | 29.8 | 9.2 | 1,200,000 | 4 | 3 |
| 8 | 20 | 37 | 31.9 | 10.2 | 7,850 | 4 | 30 |
| 9 | 20 | 38 | 34.0 | 9.8 | 340 | 1 | 6 |
| 10 | 20 | 39 | 33.4 | 9.5 | 75 | 1 | 30 |
| 11 | 20 | 40 | 31.0 | 7.1 | 335 | 2 | 30 |
| 12 | 15 | 34 | 30.8 | 10.4 | 7.5 | 1 | 60 |
| 13 | 15 | 37 | 29.6 | 10.6 | 8 | 1 | 60 |
| 14 | 15 | 38 | 28.7 | 10.7 | 8.5 | 1 | 60 |

[1] This sample was further diluted with 105 milliliters of water.

When less than 35 milliliters of water was charged with the indicated amounts of Polyquat 55.6 and sodium hydroxide at 40 grams of EPCHD charge, gelatinous masses were obtained.

Thus, for each 100 grams of Polyquat 55.6 and 40 grams of EPCHD charged, the highest product viscosities are obtained when about 35 milliliters of water are charged; this corresponds to about 10 moles of water per mole of repeating Polyquat 55.6 units. At a charge of 100 grams of Polyquat 55.6 and 20 grams of EPCHD, the optimum ratio of water charged is about 10–11 moles of water per mole of repeating Polyquat 55.6 unit.

Wide variations in polymer solution viscosity, even under apparently identical conditions, show the extreme sensitivity of the reaction between Polyquat 55.6 and EPCHD to the amount of water initially present. These experiments further show that the amount of water initially charged may vary in the range between 10 and 12 moles per mole of Polyquat 55.6 units in order to obtain products which have higher viscosities than the Polyquat 55.6 solutions charged but are still fluid. It will be appreciated, however, when the rate of water addition is raised you may obtain a lower viscosity product even if the initial water content is lowered.

Example X

This example shows the effect of varying the amount of epichlorohydrin charged in the reaction with Polyquat 55.6 on polymer solution viscosity. Reactions in this example were carried out at 70° C. and water (125 milliliters) was added at a rate of 1.4 milliliters per minute. To the reaction vessel were charged: 100 grams of Poly- These experiments show that highly viscous gel-free solutions are obtained when from 20 to 40 grams of EPCHD are charged per 100 grams of Polyquat 55.6; these EPCHD levels represent from 1.1 to about 2.3 moles of EPCHD per mole of Polyquat 55.6 units. It is also apparent that some slight viscosity increases are obtained, even at the lower solids level of the chain-extended polymer, when from about 0.55 to about 3.0 moles of EPCHD are charged per mole of Polyquat 55.6.

Example XI

Experiments in this example show the effect of temperature during the reaction between a poly(quaternary ammonium) polyelectrolyte and EPCHD on viscosities of the resulting polymer solutions. The charge in each experiment was 100 grams of Polyquat 55.6, 8 grams of sodium hydroxide, 35 milliliters of water, and 40 grams of EPCHD. Additional water (125 milliliters) was added at a rate of 1.4 milliliters per minute.

TABLE 5

| Run No. | Temperature, °C. | Percent solids | pH (after 12 hours) | Brookfield viscosity at 23° C. | | |
|---|---|---|---|---|---|---|
| | | | | Cps. | Spindle No. | R.p.m. |
| 1 | 50 | 31.3 | 8.3 | 30 | 1 | 60 |
| 2 | 60 | 31.7 | 8.6 | 100 | 1 | 12 |
| 3 | 70 | 33.1 | 8.1 | 23,000 | 4 | 6 |
| 4 | 80 | 32.3 | 8.2 | 76 | 1 | 30 |

These data show the temperature sensitivity of the chain-extension reaction. Optimal results are measured by high polymer viscosities are obtained near 70° C., although increased solution viscosities compared to Polyquat 55.6 are obtained when the reactions are run in the range between 50° C. and 80° C.

Example XII

Intrinsic viscosities [η] were determined at 25° C. in 0.4 M KCl and 0.4 M KBr for Polyquat 55.6 prepared in Example IV and for the products from runs 3 and 5 of Example IX. Results were:

TABLE 6

| Source of sample | [η] 0.4 M KBr | [η] 0.4 M KCl | Brookfield viscosity (cps.) | Percent solids |
|---|---|---|---|---|
| Polyquat 55.6 | 0.17 | 0.22 | 52 | 33.0 |
| Example IX: | | | | |
| Run 5 | 0.30 | 0.49 | 320 | 32.4 |
| Run 3 | 0.55 | 0.69 | 6,150 | 33.9 |

A copolymer similar to Polyquat 55.6 having the repeating unit structure heretofore noted, i.e.

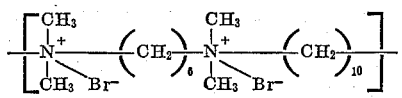

prepared from N,N,N',N'-tetramethyl-1,6-hexane diamine and 1,10-dibromodecane was reported by Rembaum in Journal of Macromolecular Science-Chemistry, volume A3(1), at page 95 (January 1969) to have [η] at 25° C. in 0.4 M KBr of 0.22 and by light-scattering measurements to have a weight average molecular weight of 15,000±500. Since the [η] of Polyquat 55.6, which has a similar structure, is close to that reported by Rembaum, it is believed that the molecular weights of the chain-extended Polyquat 55.6 derivatives are well above 10,000, as is the Polyquat 55.6.

Example XIII

Selected poly(quaternary ammonium) polyether polyelectrolyte solutions prepared in the preceeding examples were analyzed for organic chloride and epoxide content. The chloride analysis was done by the method described in Journal of the Association of Official Agricultural Chemistry, volume 44, page 595 (1961) and the epoxy analysis according to Analytical Chemistry, volume 26,878 (1954). When the samples prepared in Example IV and in run 5 of Example IX were extracted with heptane, there was a slight decrease in the amount of organic chloride remaining. Treatment of an aliquot of the solution prepared in Example VII, run 5 with 2 N sodium hydroxide for 1 hour at 30° C. converted the chlorohydrin present quantitatively to epoxide. The amount of organic chloride present as chlorohydrin, from the epoxide content of the sample, was 5.93%.

TABLE 7

| Source of sample | Percent epoxide | Percent organic chloride | Percent organic chloride after heptane extraction |
|---|---|---|---|
| Example: | | | |
| IV | 0.43 | 7.50 | 6.09 |
| IX, Run 4 | 0.36 | 2.91 | |
| IX, Run 5 | 0.20 | 5.83 | 4.87 |
| X, Run 4 | 0.26 | 4.79 | |
| X, Run 2 | 0.23 | 2.45 | |
| X, Run 5 | 0.41 | 6.21 | |
| X, Run 6 | 0.49 | 5.17 | |

These results show that the poly(quaternary ammonium) polyether polyelectrolytes of this invention contain relatively little unreacted EPCHD since there is no more difference than experimental error between the chloride content of extracted and unextracted samples. The good agreement between the chloride content in the caustic treated material from Example IX, run 5, is also consistent with this result. These results further indicate that the polymer solution may be used without further purification and without danger of residual reactive groups in the polyelectrolytes producing unwanted reactions with substrates.

Example XIV

This example illustrates the use of poly(quaternary ammonium) polyether polyelectrolytes of this invention as retention aids in wet-end addition. Solka 30A bleached Northern Softwood Kraft was beaten to a Canadian standard freeness of 500 milliliters. To the pulp was added 20 lbs. per ton of rosin, 50 lbs. per ton of aluminum sulfate, 200 lbs. per ton of clay and 50 lbs. per ton of aluminum sulfate, 200 lbs. per ton of clay and 50 lbs. per ton of titanium dioxide. The pH of the slurry was adjusted with sulfuric acid.

The slurry was agitated for 60 seconds after polyelectrolyte solution was added and then paper was made on a Noble and Wood hand sheet machine using the pulp slurry to give a 5 gram sheet 8 inches square. The sheets had a moisture content of 5% after drying. The sheets were conditioned for 24 hours at 70° F. and 50% relative humidity. The paper was examined for pigment retention.

In determining pigment retention, the sheets were fired for 2 hours at 900° C. The ash was cooled in a desiccator over Drierite ($CaSO_4$) for about 30 minutes and weighed. The percentage of ash, as indicated in the tables below, is a measure of the amount of pigment incorporated in the paper.

TABLE 8.—PIGMENT RETENTION IN WET-END ADDITION AT pH 6.0

| Source of polymer | Percent solids | Brookfield viscosity | Percent residual pigment at polymer dosages of— | |
|---|---|---|---|---|
| | | | 0.5 lb. per ton | 1.0 lb. per ton |
| Example IX: | | | | |
| Run 5 | 32.4 | 320 | 36.4 | 40.3 |
| Run 4 | 29.9 | 1,675 | 38.8 | 37.4 |
| Run 3 | 33.9 | 6,150 | 37.1 | 44.0 |
| Run 2 | 31.9 | 18,500 | 36.1 | 41.9 |
| Run 1 | 33.1 | 23,000 | 38.8 | 44.5 |
| Polyquat 55.6 | 55.6 | 52 | 30.5 | 30.5 |
| None | | | 33.5 | 33.5 |

These experiments show that the polyelectrolytes of this invention function as efficient pigment retention aids in wet-end addition. Papers prepared using chain-extended polyelectrolytes have, on the average, better than 40% pigment retention at a level of 1.0 lb. per ton at pH 6.0. This retention is significantly higher than that observed with Polyquat 55.6. In the testing at other pH levels, the polymeric electrolyte of this invention has been found to provide a significantly higher pigment retention level than other commercially available retention aids. Good retention properties obtained appear to be essentially independent of polymer viscosity, once a threshold value of around 300 centipoises is exceeded.

Example XV

This example shows the usefulness of polyether polyelectrolytes of this invention for clarifying white-water from paper making. Evaluations were done in a laboratory simulaiton of a paper mill flotation unit in which fiber and pigments are lifted to the surface by air and the solids skimmed off. Ground wood fiber beaten to 50 milliliters Canadian freeness, clay (50% by weight of the pulp), rosin, aluminum sulfate at a level of 50 lbs. per ton of pulp, and sodium aluminate at a level of 1000 p.p.m. were made up into the synthetic waste water mixture. The polymeric flocculant was added at the indicated level and then 500 milliliters water pressurized with air at 50 lbs. per square inch with air was added; the mixture was agitated and allowed to stand for one minute. A sample was taken at the mid-point and percent light transmission at 530 millimicrons (m$\mu$) was determined. The following data were obtained.

TABLE 9

| Source of additive | Dosage, p.p.m. | Percent transmission at 530 m$\mu$ |
|---|---|---|
| None (raw) | | 10 |
| Processed white-water [1] | | 76 |
| Polyquat 55.6 | 0.1 | 86 |
| Do | 1.0 | 92 |
| Example IX, Run 3 | 0.1 | 89 |
| Do | 1.0 | 98 |
| Tylite No. 9 [2] | 0.1 | 90 |

[1] Treated with air, no polymer present.
[2] Tylite No. 9 is a cationic polymeric flocculant a product of Pacific Resin Co.

These experiments show that both the poly(quaternary ammonium) polyelectrolytes used as starting materials in this invention and the chain-extended polyether polyelectrolytes are efficient in white-water clarification processes. The polyether polyelectrolyte has an efficiency comparable to another commercially useful material.

Example XVI

This example illustrates the use of the poly(quaternary ammonium) polyester polyelectrolytes of this invention for flocculation and separation of sewage. Solutions of the polyelectrolyte were added to raw sewage from Camden-Wyoming, Delaware having a solids content of about 0.5% and stirred for 3 minutes at 100 r.p.m., for 10 minutes at 35 to 40 r.p.m., for 10 minutes at 3 to 5 r.p.m. and the percent transmission at 530 m$\mu$ was determined from a sample taken at the mid-point. The raw sewage had a transmission of 27.0%. In the table below are given results for both the starting Polyquat 55.6 and the polymeric flocculant prepared in Example IV.

TABLE 10

| | Percent transmission at 530 m$\mu$ (polymer added) | | |
|---|---|---|---|
| Level of polymer solution (p.p.m.) | Polyquat 55.6 | Dow C-31 [1] | Solution from Example IV (31.9% solids, viscosity 500 cps.) |
| 1 | 43.0 | 40.5 | 44.0 |
| 3 | 44.5 | .40.0 | 45.8 |
| 5 | 46.0 | 40.7 | 47.0 |
| 10 | 50.6 | 42.0 | 52.5 |

[1] A polymeric coagulant which is a product of the Dow Chemical Co.

Advantageously, the chain-extended polymers of this invention are more efficient than the starting Polyquat and a commercial material such as Dow C-31.

Example XVII

The experiments in this example further illustrate the excellent properties of polyether polyelectrolytes as flocculating agents.

(a) Flocculation studies were performed on English supreme kaolin clay by placing 20 grams of clay in a 1000 milliliter graduated cylinder and adding water to the top mark. One hundred milliliters of a polymer solution (including several of the polyelectrolytes heretofore used in the preceding example and a few known commercial products) was added and the suspension was agitated by stirring manually for 1 minute to achieve a uniform suspension. The time required for the settling meniscus, that is the demarcation between the turbid and clear portions of the liquid, to fall from the 1000 milliliter to the 600 milliliter graduation lines was determined. The results are shown in Table 11 below.

At equivalent levels of flocculant solution addition, it will be observed that polyether polyelectrolyte solutions having a Brookfield viscosity in excess of about 50 centipoises at a solids level of between about 15 and about 35% are comparable or more efficient than other products.

Even at levels as low as 1 part per million, polyether polyelectrolyte solutions in the 100 to 25,000 Brookfield viscosity range at about 30% solids flocculate kaolin slurries in a range varying from 250 to 370 seconds. This time is shorter or compares favorably with that of the commercial flocculants tested. At higher levels, such as in the 2 to 5 p.p.m. range, the polymeric flocculants of the invention usually are more efficient than the commercially available material; that is, the clay suspensions settle more rapidly when the polyelectrolytes of this invention are used. It is further seen that all polyether polyelectrolytes are more efficient flocculating agents than the starting Polyquat 55.6 and that the more efficient and thus preferred range of solutions are those with Brookfield viscosities between 100 and 25,000 cps. at between 25 and 35% solids.

TABLE 11

| Flocculant (source) | Percent solids | Brookfield viscosity of polymer | Settling time in seconds at varying dosage of flocculant (in p.p.m.) | | | | | | | |
|---|---|---|---|---|---|---|---|---|---|---|
| | | | 1 | 2 | 3 | 4 | 5 | 6 | 7 | 9 |
| Polyquat 55.6 | 55.6 | 52 | 651 | 650 | 645 | 642 | 640 | | | |
| Example: | | | | | | | | | | |
| XI, Run 1 | 31.3 | 30 | 460 | 423 | 405 | 392 | 385 | 380 | 375 | 372 |
| XI, Run 2 | 31.7 | 100 | 290 | 247 | 225 | 210 | 200 | 192 | 187 | 177 |
| IX, Run 5 | 32.4 | 320 | 250 | 170 | 160 | 120 | 110 | | | |
| IX, Run 4 | 29.9 | 1,675 | 340 | 237 | 195 | 173 | 162 | 155 | 152 | |
| IX, Run 3 | 33.9 | 6,150 | 260 | 205 | 177 | 163 | | | | |
| IX, Run 1 | 33.1 | 23,000 | 370 | 305 | 268 | 245 | 230 | 220 | 212 | 205 |
| X, Run 2 | 29.0 | 156,000 | 277 | 240 | 223 | 217 | | | | |
| Dow C-90 [1] | | | 410 | 335 | 298 | 280 | 270 | 263 | 260 | 260 |
| PEI-1120 [2] | | | 287 | 250 | 235 | 225 | 220 | 215 | 215 | 217 |
| Tylite No. 9 [3] | | | 300 | 267 | 240 | 215 | 195 | 176 | 158 | 123 |

[1] A product of Dow Chemical Co.
[2] A polyethyleneimine, a product of Dow Chemical Co.
[3] A product of Pacific Resin Co.

(b) The amounts of flocculant solutions indicated in Table 12 below were added to kaolin slurries prepared in part (a) and settling times were determined. Values are given in Table 12 below.

TABLE 12

| Flocculant (source) | Percent solids | Brookfield viscosity of polymer | Settling time in seconds at varying dosages of flocculant (in p.p.m.) | | | | | |
|---|---|---|---|---|---|---|---|---|
| | | | 1 | 2 | 3 | 5 | 7 | 9 |
| Example: | | | | | | | | |
| VII, Run 3 | 17.0 | 1,850 | 147 | 113 | 99 | 94 | 80 | 90 |
| VII, Run 5 | 26.3 | 52 | 160 | 108 | 98 | 85 | 89 | 99 |
| VII, Run 4 | 33.4 | 75 | 104 | 81 | 76 | 86 | 103 | 103 |
| VII, Run 9 | 32.2 | 11 | 299 | 256 | 250 | 289 | 291 | 299 |
| VII, Run 10 | 28.7 | 8.5 | 291 | 297 | 339 | 273 | 378 | |
| VII, Run 2 | 31.9 | 7,850 | 147 | 113 | 101 | 91 | 89 | 92 |
| VII, Run 1 | 30.6 | 545 | 123 | 100 | 91 | 79 | 84 | 88 |
| VI, Run 7 | 30.8 | 7.5 | 321 | 308 | 401 | | | |
| IX, Run 12 | 31.0 | 335 | 144 | 100 | 86 | 75 | 78 | 82 |
| IX, Run 10 | 34.0 | 340 | 126 | 93 | 85 | 74 | 68 | 72 |
| IX, Run 14 | 29.6 | 8 | 314 | 321 | | | | |
| IX, Run 7 | 33.1 | 89 | 106 | 86 | 82 | 83 | 96 | 103 |
| Tylite No. 9 [1] | | | 160 | 106 | 79 | 71 | 56 | 59 |
| Cat-Floc [2] | | | 70 | 74 | 82 | 104 | 118 | 129 |

[1] Product of Pacific Resin Co.
[2] Product of Calcon Co.

What is claimed is:
1. A water-soluble hydrophilic polymer, which comprises a poly(quaternary ammonium) polyether polyelectrolyte salt containing quaternary nitrogen atoms in a polymeric backbone and having a repeating unit of the following generalized formula:

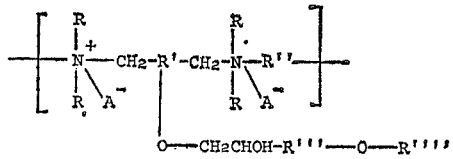

wherein R is an alkyl group containing from 1–4 carbon atoms; R' is the residue of a hydroxy-substituted lower alkylene group containing up to about 10 carbon atoms; R'' is an organic radical selected from the group consisting of an alkylene group containing 1 to 4 carbon atoms and a $(CH_2)_n$—O—$(CH_2)_n$ group wherein $n$ is an integer from 1 to 4; R''' is an alkylene group containing 1 to 4 carbon atoms and R'''' is selected from the group consisting of terminal hydrogen, an R' residue of the same polymer molecule and an R' residue of another molecule of the water-soluble hydrophilic polymer, and A is an anion selected from the group consisting of chloride, bromide, and iodide.

2. A water-soluble hydrophilic polymer of claim 1, in which the intrinsic viscosity of said salt in 0.4 M potassium bromide solution at 25° C. is between 0.25 and about 0.60.

3. The polymer of claim 1, in which R is a methyl group, R' is a methylidyne group, R'' is an ethyleneoxyethylene group, R''' is a methylene group, and A is chloride.

4. The polymer of claim 1, in which an aqueous solution of from about 15 to about 35% by weight of the water-soluble hydrophilic polymer has a Brookfield viscosity of at least 50 centipoises at about 25° C.

5. A method of chain-extending a water-soluble flocculating polymer containing quaternary nitrogen atoms within a polymeric backbone which comprises reacting a poly(quaternary ammonium salt) having repeating units of the following generalized formula:

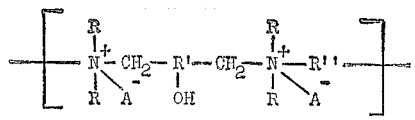

wherein R is an alkyl group containing from 1–4 carbon atoms; R' is the residue of a hydroxy-substituted alkylene group containing up to about 10 carbon atoms; R'' is an organic radical selected from the group consisting of alkylene group containing from 1–4 carbon atoms and a $(CH_2)_n$—O—$(CH_2)_n$ group wherein $n$ is an integer from 1 to 4; and A is an anion selected from the group consisting of chloride, bromide and iodide, with an epoxyhaloalkane in aqueous medium at a temperature from about 50° C. to about 80° C. in the presence of an alkaline agent.

6. The method of claim 5 in which the epoxyhaloalkane is selected from the group consisting of epichlorohydrin; 1-bromo-2,3-epoxypropane, and 1 - chloro-3,4-epoxy-butane; 2-chloro-5,6-epoxyhexane; and 1,2-epoxy-6-iodohexane.

7. The method of claim 5 in which the alkane agent is selected from the group consisting of alkali metal hydroxides and alkaline earth oxides.

8. The method of claim 6, in which the amount of water initially present is from about 9 to about 12 moles per mole of poly(quaternary ammonium salt) repeating unit.

9. The method of claim 8 which further comprises adding from about 25 to about 120 moles of water of dilution after initiation of the reaction.

10. The method of claim 6, in which R is a methyl group, R' is a methylidyne group, R'' is an ethyleneoxyethylene group, A is chloride, the epoxyhaloalkane is epichlorohydrin, the alkaline agent is sodium hydroxide, and the temperature in the aqueous medium is from about 60° C. to about 75° C.

11. The method of claim 6 in which the poly(quaternary ammonium salt) is reacted with from about 0.55 mole to about 3.0 mole of epichlorohydrin and from about 0.75 mole to about 1.6 mole of sodium hydroxide per mole of said poly(quaternary ammonium salt) repeating unit in from about 9 to about 12 moles of water and from about 25 to about 120 moles of water of dilution are added after initiation of the reaction.

References Cited
UNITED STATES PATENTS

| 2,194,906 | 3/1940 | Krzikalla et al. | 260—584 |
| 2,261,002 | 10/1941 | Ritter | 260—570 |
| 2,807,910 | 10/1957 | Erickson | 47—58 |
| 2,995,512 | 8/1961 | Weidner et al. | 210—54 |
| 3,320,317 | 5/1967 | Rogers et al. | 260—567.6 |
| 3,370,048 | 2/1968 | Reynolds | 260—79.3 |
| 3,409,547 | 11/1968 | Dajani | 210—54 |

OTHER REFERENCES

Chemical Abstracts 57, 6171d (1962).

WILLIAM H. SHORT, Primary Examiner

E. A. NIELSEN, Assistant Examiner

U.S. Cl. X.R.

210—54; 260—2, 29.2 EP, 567.6 P

UNITED STATES PATENT OFFICE
CERTIFICATE OF CORRECTION

Patent No. 3,663,461　　　　　　　　　Dated  May 16, 1972

Inventor(s)  Edward Witt

It is certified that error appears in the above-identified patent and that said Letters Patent are hereby corrected as shown below:

Column 4, line 25, "1,3-dichlorobutane" should read -- 1,4-dichlorobutane --; column 6, line 49, "ad" should read -- and --; column 12, line 74, "are" should read -- as --; column 16, Table 10, line 11, second column, "50.6" should read -- 50.5 --.

Signed and sealed this 19th day of December 1972.

(SEAL)
Attest:

EDWARD M. FLETCHER, JR.　　　　　　　ROBERT GOTTSCHALK
Attesting Officer　　　　　　　　　　Commissioner of Patents